(12) United States Patent
Duncan et al.

(10) Patent No.: US 8,592,747 B2
(45) Date of Patent: Nov. 26, 2013

(54) PROGRAMMABLE FILTERS FOR IMPROVING DATA FIDELITY IN SWEPT-WAVELENGTH INTERFEROMETRY-BASED SYSTEMS

(75) Inventors: Roger Glen Duncan, Christiansburg, VA (US); Brooks A. Childers, Christiansburg, VA (US)

(73) Assignee: Baker Hughes Incorporated, Houston, TX (US)

( * ) Notice: Subject to any disclaimer, the term of this patent is extended or adjusted under 35 U.S.C. 154(b) by 381 days.

(21) Appl. No.: 13/008,979

(22) Filed: Jan. 19, 2011

(65) Prior Publication Data
US 2012/0181420 A1 Jul. 19, 2012

(51) Int. Cl.
*G02B 6/00* (2006.01)
*G06F 19/00* (2011.01)
*G02F 2/00* (2006.01)

(52) U.S. Cl.
USPC ............. 250/227.14; 385/12; 702/6; 702/190

(58) Field of Classification Search
USPC ............. 250/227.14, 227.16, 227.18, 227.19; 385/12, 13; 702/6, 42, 190–197
See application file for complete search history.

(56) References Cited

U.S. PATENT DOCUMENTS

| | | | |
|---|---|---|---|
| 4,440,239 A * | 4/1984 | Evans | 175/5 |
| 4,677,596 A * | 6/1987 | Lyle et al. | 367/46 |
| 6,222,970 B1 | 4/2001 | Wach et al. | |
| 6,266,465 B1 | 7/2001 | Hickey | |
| 6,947,650 B1 | 9/2005 | Homa | |
| 6,995,899 B2 | 2/2006 | Aronstam | |
| 7,104,141 B2 | 9/2006 | Zerwekh et al. | |
| 7,257,301 B2 | 8/2007 | Homa et al. | |
| 7,282,698 B2 | 10/2007 | Childers | |
| 7,310,456 B1 | 12/2007 | Childers | |
| 7,319,514 B2 | 1/2008 | Ritchie et al. | |
| 7,338,215 B2 | 3/2008 | Reynolds | |
| 7,369,730 B2 | 5/2008 | Childers | |
| 7,379,631 B2 | 5/2008 | Poland et al. | |
| 7,403,871 B2 * | 7/2008 | Papadimitriou et al. | 702/185 |
| 7,421,905 B2 | 9/2008 | Zerwekh et al. | |
| 7,433,551 B2 | 10/2008 | Poland et al. | |
| 7,437,027 B2 | 10/2008 | Zerwekh et al. | |
| 7,471,860 B2 | 12/2008 | Coronado et al. | |
| 7,493,009 B2 | 2/2009 | Homa | |
| 7,509,000 B2 | 3/2009 | Coronado | |

(Continued)

FOREIGN PATENT DOCUMENTS

WO    WO03071285 A2    8/2003

OTHER PUBLICATIONS

International Search Report and Written Opinion dated Jun. 27, 2012 for International Application No. PCT/US2011/063866.

*Primary Examiner* — John Lee
(74) *Attorney, Agent, or Firm* — Cantor Colburn LLP

(57) ABSTRACT

A method, system and apparatus for obtaining a parameter of interest from a plurality of sensors in a fiber optic cable deployed in a wellbore are disclosed. Light having variable frequency within a range of frequencies is propagated along the fiber optic cable. Signals are received that are responsive to interaction of the propagated light with the plurality of sensors. The received signals are filtered using a programmable filter. The parameter of interest is obtained from the filtered signals. In one aspect, the fiber optic cable is coupled to a member deployed in the wellbore and the parameter of interest is related to the member.

21 Claims, 3 Drawing Sheets

(56) References Cited

U.S. PATENT DOCUMENTS

| | | |
|---|---|---|
| 7,516,015 B2 * | 4/2009 | Sinha et al. ............ 702/6 |
| 7,526,160 B1 | 4/2009 | Homa et al. |
| 7,557,339 B2 | 7/2009 | Poland et al. |
| 7,628,543 B2 | 12/2009 | Coronado |
| 7,664,347 B2 | 2/2010 | Childers et al. |
| 7,719,690 B2 | 5/2010 | Childers et al. |
| 7,744,292 B2 | 6/2010 | Stoesz |
| 7,752,870 B1 | 7/2010 | Homa |
| 7,792,405 B2 | 9/2010 | Stoesz et al. |
| 7,840,102 B2 | 11/2010 | Boyd |
| 8,340,618 B2 * | 12/2012 | Sorrells et al. .......... 455/313 |
| 2004/0028311 A1 | 2/2004 | Moslehi et al. |
| 2006/0235617 A1 * | 10/2006 | Sinha et al. ............ 702/6 |
| 2008/0232425 A1 | 9/2008 | Hall et al. |
| 2009/0003760 A1 | 1/2009 | Stoesz et al. |
| 2009/0007652 A1 | 1/2009 | Childers |
| 2009/0008536 A1 * | 1/2009 | Hartog et al. ........ 250/227.14 |
| 2009/0045146 A1 | 2/2009 | Stoesz |
| 2009/0135023 A1 * | 5/2009 | Wassermann et al. ..... 340/855.4 |
| 2009/0178802 A1 | 7/2009 | O'Malley |
| 2009/0189617 A1 * | 7/2009 | Burns et al. ............ 324/649 |
| 2009/0252463 A1 | 10/2009 | Stoesz et al. |
| 2009/0290160 A1 * | 11/2009 | Taverner ............ 356/419 |
| 2010/0128348 A1 * | 5/2010 | Taverner ............ 359/572 |
| 2010/0219334 A1 | 9/2010 | Legrand et al. |
| 2011/0019178 A1 * | 1/2011 | Vlatas ............ 356/32 |
| 2011/0108720 A1 * | 5/2011 | Ford et al. ............ 250/262 |
| 2011/0308788 A1 * | 12/2011 | Ravi et al. ............ 166/250.01 |
| 2012/0082466 A1 * | 4/2012 | Wu et al. ............ 398/183 |
| 2012/0126992 A1 * | 5/2012 | Rodney et al. ............ 340/850 |
| 2012/0139746 A1 * | 6/2012 | Chen et al. ............ 340/853.2 |
| 2012/0143521 A1 * | 6/2012 | Chen et al. ............ 702/42 |
| 2012/0143522 A1 * | 6/2012 | Chen et al. ............ 702/42 |
| 2012/0143523 A1 * | 6/2012 | Chen et al. ............ 702/42 |
| 2012/0143524 A1 * | 6/2012 | Chen et al. ............ 702/42 |
| 2012/0143525 A1 * | 6/2012 | Chen et al. ............ 702/42 |
| 2012/0181420 A1 * | 7/2012 | Duncan et al. ............ 250/269.1 |
| 2012/0223221 A1 * | 9/2012 | Jones ............ 250/269.1 |
| 2012/0237205 A1 * | 9/2012 | Duncan et al. ............ 398/25 |
| 2012/0298850 A1 * | 11/2012 | Ford et al. ............ 250/255 |

* cited by examiner

PROGRAMMABLE FILTERS FOR IMPROVING DATA FIDELITY IN SWEPT-WAVELENGTH INTERFEROMETRY-BASED SYSTEMS

BACKGROUND OF THE DISCLOSURE

1. Field of the Disclosure The present disclosure relates to obtaining a parameter of interest in a swept-wavelength interferometry systems for use in wellbores.

2. Description of the Related Art

In various aspects of oil exploration and production, optical sensors are deployed downhole and a light source at a surface location supplies light to the optical sensors over a fiber optic cable. Light interacts with the optical sensors to produce a reflected light having a signal that is returned to the surface to be measured. Typically, the returned light is sampled at a sampling device which is controlled using a trigger signal obtained from a suitable source, such as the light source. When sampling signals, a sampling frequency is generally selected that prevents false reconstruction of the original signal, a process known as aliasing. The highest signal frequency that can be successfully reconstructed for a selected sampling frequency is known as the Nyquist frequency. Some systems currently in use include anti-aliasing filters that remove signals above a selected fixed cut-off frequency of the filter. However, if the signal frequency is changing, as in swept-wavelength systems, such filters may be inadequate. The need to design systems to prevent signal aliasing introduces factors that constrain the utility of the system, or can reduce data fidelity. The present disclosure therefore provides a method and apparatus for moderating these constraints and/or improving the data fidelity in swept-wavelength systems.

SUMMARY OF THE DISCLOSURE

In one aspect, the present disclosure provides a method of obtaining a parameter of interest from a plurality of sensors in a fiber optic cable deployed in a wellbore, the method including: propagating light having variable frequency within a range of frequencies along the fiber optic cable; receiving signals responsive to interaction of the propagated light with the plurality of sensors; filtering the received signals using a programmable filter; and obtaining the parameter of interest from the filtered signals.

In another aspect, the present disclosure provides an apparatus for obtaining a parameter of interest from a plurality of sensors in a fiber optic cable deployed in a wellbore, the apparatus including a light source configured to propagate a light having a variable frequency within a range of frequencies along the fiber optic cable; a detector configured to receive signals responsive to interaction of the propagated light with the plurality of sensors; a programmable filter configured to filter the received signals; and a processor configured to obtain the parameter of interest from the filtered signals.

In yet another aspect, the present disclosure provides a system for obtaining a parameter of interest of a member deployed in a wellbore. The system includes a fiber optic cable having a plurality of sensors therein coupled to the member; a light source configured to propagate a light having a variable frequency within a range of frequencies along the fiber optic cable; a detector configured to receive signals responsive to interaction of the propagated light with the plurality of sensors; a programmable filter configured to filter the received signals; and a processor configured to obtain the parameter of interest of the member from the filtered signals.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

For detailed understanding of the present disclosure, references should be made to the following detailed description of the exemplary embodiment, taken in conjunction with the accompanying drawings, in which like elements have been given like numerals and wherein.

DETAILED DESCRIPTION OF THE DISCLOSURE

Figure 1:
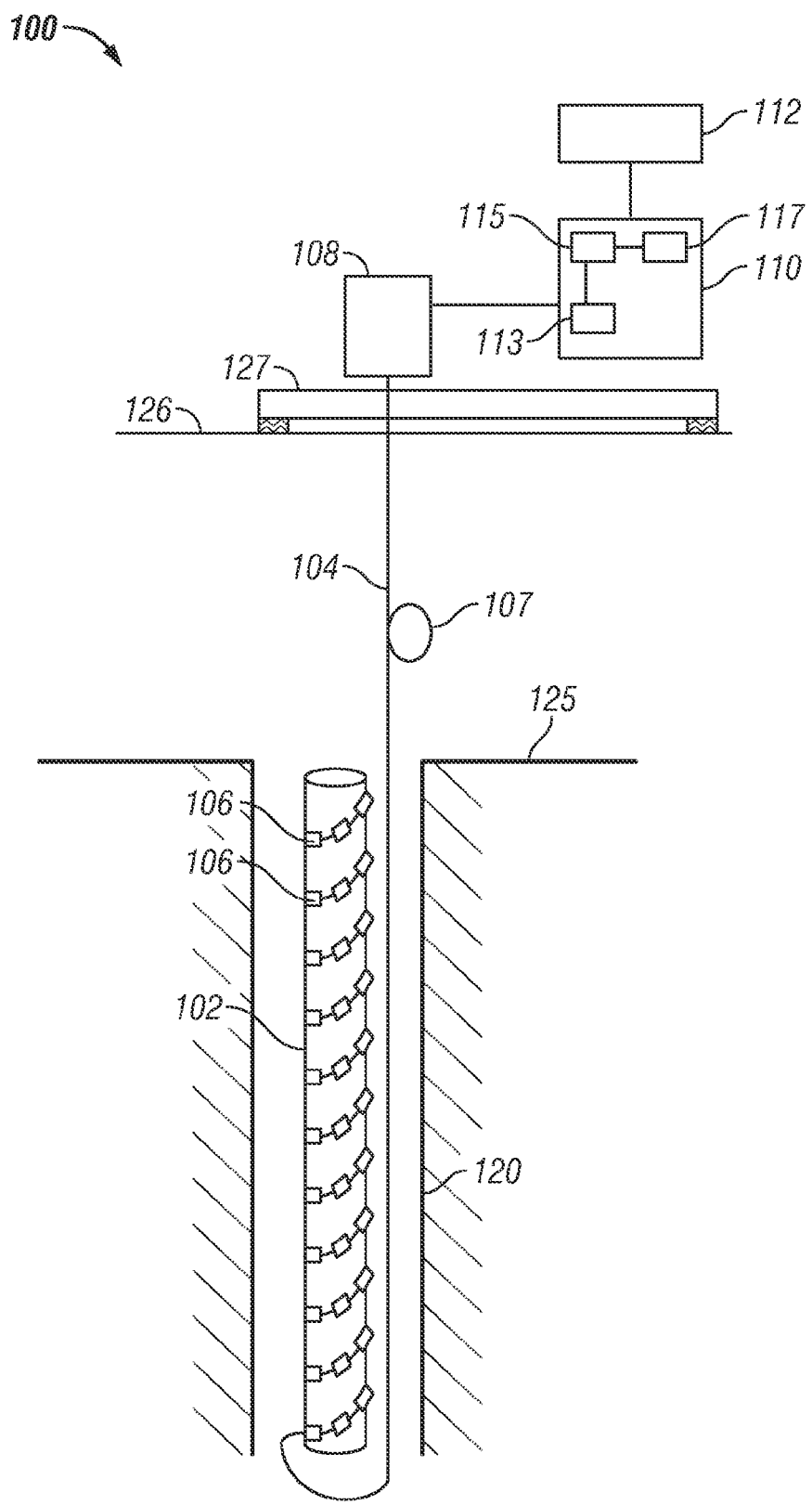
FIG. 1 shows an exemplary oil production system suitable for use with the exemplary methods and optical system described herein.

FIG. 1 shows an exemplary oil production system 100 suitable for use with the exemplary methods and optical system described herein. The exemplary production system 100 of FIG. 1 includes a tubular 102 in wellbore 120 in optical communication with surface electronics via fiber optic cable 104. Fiber optic cable 104 includes a plurality of sensors 106. Each of the plurality of sensors 106 is configured to provide an optical signal upon interaction with a light propagating in the fiber optic cable 104. The fiber optic cable 104 is wrapped around the surface of the tubular 102 and each of the plurality of sensors 106 is thereby attached at a particular location to tubular 102. A change in a parameter, such as strain or temperature, at the particular location is therefore detected by the sensor attached at or near the particular location, which thus provides a signal corresponding to the detected change in parameter. These signals may be processed at surface electronics to obtain a parameter such as, for example, a strain, a temperature or a deformation of the tubular. Therefore, the fiber optic cable may be used, for example, in various methods such as Real Time Compaction Monitoring (RTCM), a temperature at the tubular using Distributed Temperature Sensing (DTS), optical frequency domain reflectometry (OFDR), or any applicable methods using swept-wavelength interferometry.

Fiber optic cable 104 is coupled at the surface location to an interrogation unit 108. The interrogation unit 108 may include a light source (not shown), typically a tunable laser for providing light to the sensors via fiber optic cable 104, and circuitry for obtaining signals from light received from the plurality of sensors 106. Interrogation unit 108 may be coupled to a data processing unit 110 and in one aspect transmits obtained signals to the data processing unit. In one aspect, the data processing unit 110 receives and processes the measured signals from the interrogation unit 108 to obtain a parameter, such as a measurement of wavelength, strain or temperature at the tubular. In various aspects, data processing unit 110 includes at least one memory 115 having various programs and data stored therein, a computer or processor 113 accessible to the memory and configured to access one or more of the programs and/or data stored therein to obtain the parameter, and a recording medium 117 for recording and storing the obtained parameter. The data processing unit 110 may output the parameter to various devices, such as a display 112 or the recording medium 117.

The exemplary production system 100 of FIG. 1 is a subsea oil production system including sensors at a tubular 102 at a sea bottom location 125 in communication with surface electronics (i.e., interrogation unit 108) located at a sea platform 127 at sea level 126. However, FIG. 1 is provided only as an illustration and not as a limitation of the present disclosure. The system may alternately be deployed at a land location and may include an oil exploration system, an oil production system, a measurement-while-drilling tool, or a wireline logging device, among others. In addition, the system may be suitable for use with any member used in an application.

Figure 2:
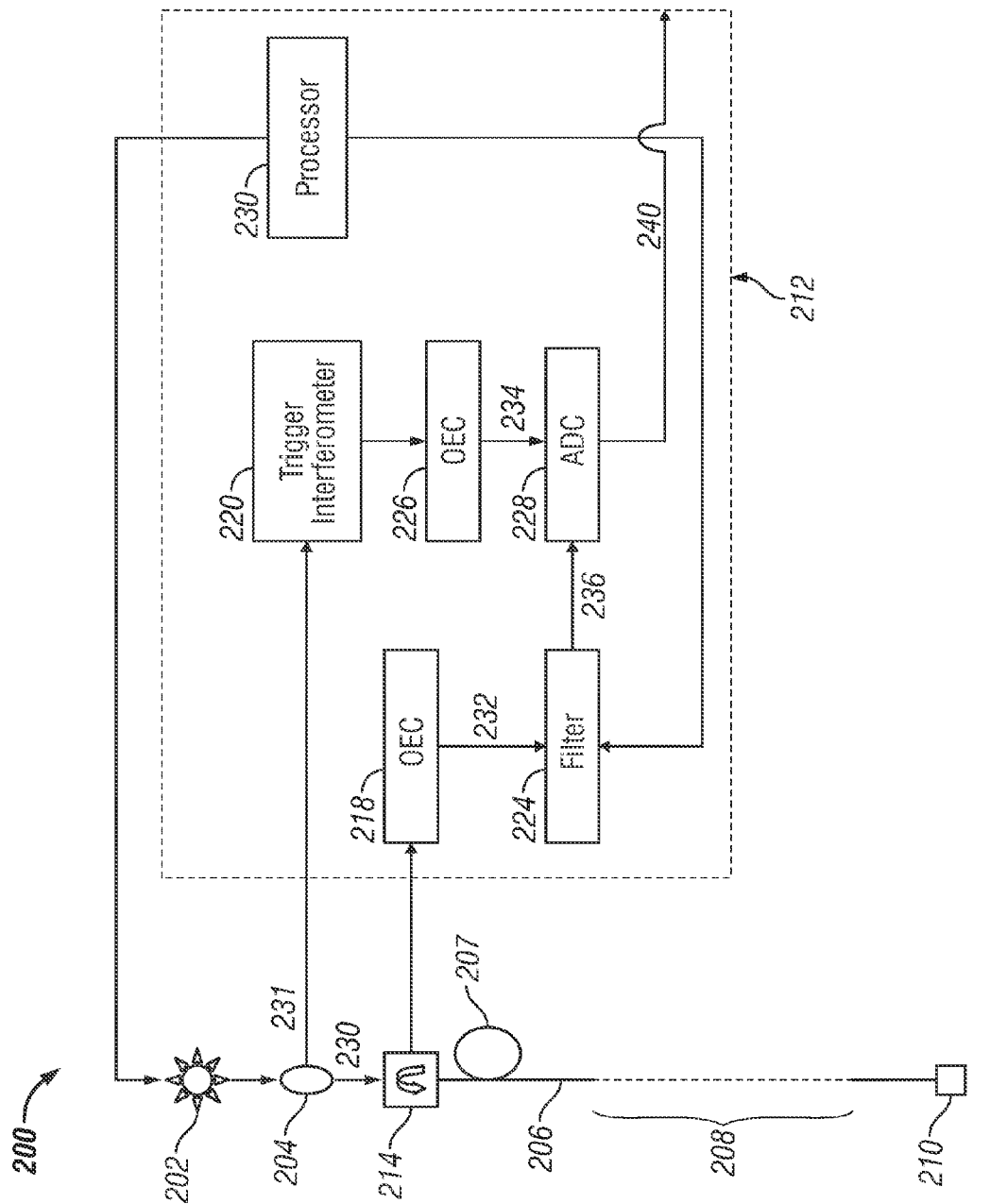
FIG. 2 shows a diagram of an exemplary optical-electronic system suitable for use with the exemplary oil production system of FIG. 1 to obtain a parameter of interest.

FIG. 2 shows a diagram of an exemplary optical-electronic system 200 suitable for obtaining a signal related to a parameter of the exemplary system of FIG. 1. The exemplary optical-electronic system 200 includes a light source 202, a fiber optic cable 206 having one or more sensors 208 formed therein and various optical and electronic devices, referred to herein as surface electronics 212, for obtaining one or more signals related to the one or more sensors 208. In one embodiment, light from light source 202 is sent to a beam splitter 204 which may split the light into a first beam of light 230 suitable for obtaining signals from one or more sensors 208 and a second beam of light 231 for creating a trigger signal. In an exemplary embodiment, beam splitter 204 splits the received light so that first beam 230 receives 90% of the light and second beam 231 receives 10% of the light. However, any splitting ratio may be used. A circulator 214 may be used to direct the first beam of light 230. A circulator generally includes a plurality of ports circularly ordered for light input and output. The circulator is configured so that light entering any port is transmitted to and exits the next port in rotation. Therefore, light from the light source 202 propagates into the fiber optic cable 206. The propagated light interacts with the sensors to produce signals which are returned to the circulator to be received at detector 218.

In an exemplary embodiment, light source 202 is a tunable laser light source that is configured to provide a light having an optical wavelength that sweeps across a range of wavelengths at a selected rate. The light source may be any tunable light source or a swept-wavelength light source that provides a light beam that sweeps across a range of wavelengths. In various aspects, the light source may be a continuous light source or a broadband light source having a filter configured to sweep a range of wavelengths. The range of wavelengths and a sweep rate of the light source may be pre-programmed or provided by a controller running software or by an operator. Alternatively, the light source can be referred to as propagating a light having a variable optical frequency over a range of frequencies.

A typical range of optical wavelengths that may be swept using the tunable light source may be from 1550 nanometers (nm) to 1650 nm at a typical sweep rate of 100 nm per second. The range and tuning rate may be selected by an operator or a processor such as processor 230 running a software program, for example. For various reasons, the tunable light source generally does not sweep the selected range in a constant linear manner but instead tends to sweep the range in a non-uniform non-linear manner. The sweep rate may increase as wavelengths get longer or direction of sweep may reverse temporarily.

Fiber optic cable 206 includes one or more sensors 208 and a reference reflector 210. In an exemplary embodiment, the one or more sensors 208 are Fiber-Bragg Gratings (FBGs). An FBG is a periodic change in the refractive index of the core of an optical fiber and is typically created using a laser etching process. An FBG reflects a percentage of incoming light, but only at a specific optical wavelength known as the Bragg wavelength, which is directly related to a grating period of the FBG. Stress and environmental factors, such as thermal changes or mechanical stress, affect the grating period and therefore produce changes in the Bragg wavelength. Thus, a measured shift in an optical wavelength of light reflected from an FBG may be used to determine a change in such environmental factors, i.e., temperature, strain, etc.

Fiber optic cable 206 is therefore configured to propagate light from the circulator 204 toward reference reflector 210 and propagate reflected light towards the circulator. The reflected light may be reflected by any of the one or more sensors 208 or by the reference reflector 210. Reference reflector 210 provides a reference signal which, when combined with light reflected from a particular sensor of the sensor array, produces an interference pattern which may be used to identify an obtained signal with the particular sensor. The interference of the reference reflector signal with a sensor signal occurs at a particular optical path length of the sensor, also known as the spatial frequency of the sensor.

Light reflected from the one or more sensors 208 of fiber optic cable 206 is sent to surface electronics 212. Exemplary surface electronics 212 includes an optical-electrical converter (OEC) 218 that receives the reflected light from the fiber optic cable 206 via the circulator 214. The OEC 218 may be any suitable detector for converting an optical signal into an electrical signal, such as a photodetector, or charge-coupled device, for example. In one embodiment, OEC 218 produces an electrical signal 232 that corresponds to the waveform of the received light and that may include various signals at higher frequencies, which may be optical and/or spatial frequencies. These various signals can be considered as noise signals. Electrical signal 232 is sent to programmable anti-aliasing filter 224 which filters out the noise signals using the exemplary methods described herein. Anti-aliasing filter 224 is selected to correspond with Nyquist sampling theory wherein a sampled signal is fully reconstructable when it is less than ½ of a sampling frequency used to sample the signal. Signals having a frequency higher than ½ of the sampling frequency reproduce false signals or aliases. Anti-aliasing filter 224 performs filtering of signal 232 to remove or reduce signal components above a selected frequency, referred to herein as the cut-off frequency. The multitude of frequencies present at the detection system is due to interference between the light reflected at the sensors and light reflected from the reference reflector. Filter 224 therefore filters these frequencies. The cut-off frequency is generally selected at ½ of the sampling rate. Filtered signals 236 are then provided to sampler 228 which in one embodiment is analog-to-digital converter (ADC). Sampler 228 receives signal 236 and trigger signal 234. Trigger signal 234 triggers the sampling of signal 236. Sampler 228 thereby produces a sampled signal, typically a digital signal. In an exemplary embodiment, the anti-aliasing filter can be tuned to remove or reduce signals having spatial frequencies above the cut-off frequency. It is noted that the frequency of the electrical signals 232 varies depending on the frequency of the light source. The cut-off frequency of anti-aliasing filter 224 also varies with the frequency of the light source and therefore is tuned to the received electrical signals 232. Operation of the anti-aliasing filter 224 is discussed below with respect to FIG. 3.

Continuing in reference to FIG. 2, the second beam of light 231 is provided to trigger interferometer 220 which provides a trigger signal based on the optical wavelength of the second beam of light 231. In an exemplary embodiment, trigger interferometer 220 produces a trigger signal using a negative-to-positive zero-crossing of an interference fringe pattern of the second beam of light 231 such as a transition from a dark region of the fringe pattern to an adjacent illuminated region of the fringe pattern. In an alternate embodiment, trigger signal 244 may be produced from a positive-to-negative zero-crossing. Any suitable part of the fringe pattern may be used to produce the trigger signal. In one embodiment, OEC 226 may be used to convert the trigger signal from an optical signal to an electrical trigger signal 234.

Electrical trigger signal 234 is received at sampler 228 to activate sampling of filtered signal 236. Sampler 228 samples filtered signal 236 at a rate determined by the electrical trigger signal 234 which is therefore related to a variable frequency of light source 202.

In an exemplary embodiment, sampler 228 provides sampled signal 240 to a processor such as the data processing unit 110 of FIG. 1. The exemplary processor may obtain a parameter from the sampled signal 240 which may be, for example, a wavelength corresponding to a particular sensor, a wavelength shift at the particular sensor, a strain at the sensor, a temperature at the sensor, or a deformation of a member coupled to the fiber optic cable. Alternatively, the parameter may be determined at any processor including processor 230.

Figure 3:
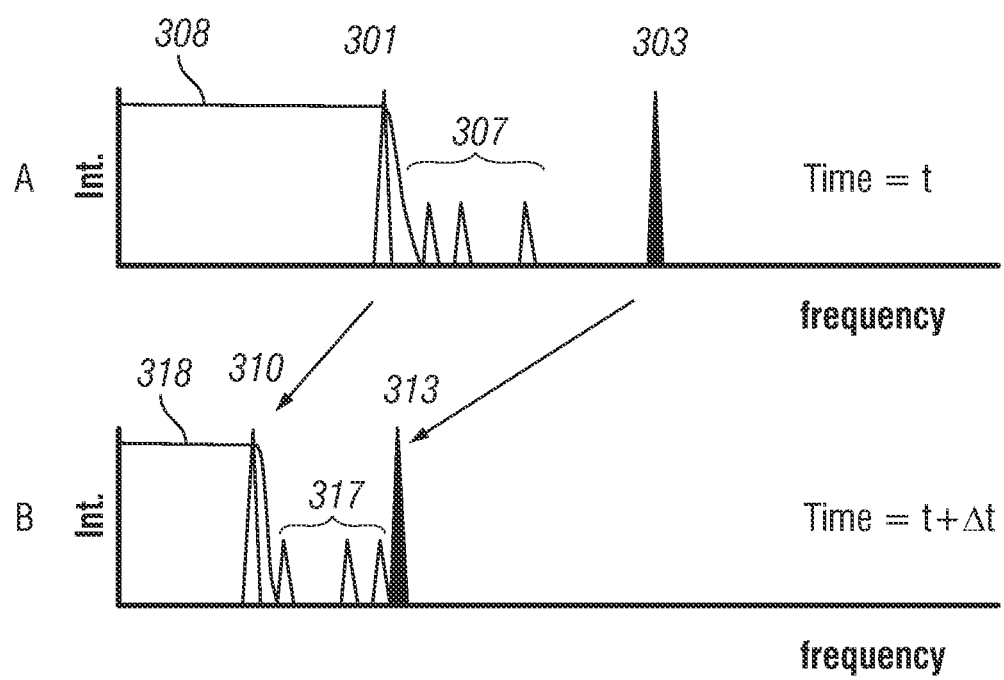
FIG. 3 shows exemplary frequency spectra of signals obtained from the exemplary optical-electrical system of FIG. 2.

FIG. 3 shows exemplary frequency spectra of signals obtained from the exemplary optical-electrical system of FIG. 2. Spectrum A shows an exemplary spectrum at time t of "high" frequency signals and spectrum B shows an exemplary spectrum at time t+Δt of "low" frequency signals. Peak 301 represents signals obtained from the one or more sensors 208 responsive to light at the high frequency range of light source 202. Peak 311 represents signals from one or more sensors responsive to light at a low frequency range of light source 202. Sampling frequency 303 of Spectrum A is suitable for sampling signal 301. However, various signals in the frequency range 307 of spectrum A, which may be noise signals accompanying signal 301 for example, produce aliasing effects when sampled using sample frequency 303. Therefore, filter 308 is applied to spectrum A to remove signals 307 prior to sampling. Similarly, sampling frequency 313 of Spectrum B is suitable for sampling signal 311. Spectrum B also includes noise 317 which can produce aliasing effects when sampled using sample frequency 313. Therefore, filter 318 is applied to spectrum B to remove signals 317 prior to sampling. Filter 308 is unsuitable for filter the signals of spectrum B, since signals 317 are not removed by application of filter 308. Therefore, the cut-off frequency of the present disclosure is programmed to be tunable to a frequency of a selected signal. In the embodiment shown in FIG. 3, filters 308 and 318 are low-pass filters. Low-pass filter passes signals whose frequencies are less than a selected ("cut-off") frequency. In alternative embodiments, the filter may be a band-pass filter centered on the exemplary signals 301 and 311.

Alternatively, peak 301 may represent signals obtained from the one or more sensors 208 at a high spatial frequency range, and peak 311 may represent signals from one or more sensors at a low spatial frequency range. In this alternate embodiment, sampling frequencies 303 and 313 sample the spatial frequencies of their respective spectra.

Returning to FIG. 2, a sample rate provide by trigger signal 234 is related to the variable frequency of light source 202. In one aspect, the filter 224 is selected by processor 230. The processor may select the cut-off frequency or a type of filter, i.e. low-pass filter, band-pass filter, etc. Processor 230 may measure a parameter of the light source 202, which may be a frequency of the light source or sweep rate of light source 202. The processor may select the filter 224 based on the measured parameter of the light source. Processor may therefore tune filter 224 to correspond to the frequency of light source 202. Non-linearities in the sweep of the light source is also generally reflected in the selected cut-off frequency at filter 224. In another aspect, processor 230 may control sweep rate and frequency range of light source 202 and synchronize filter 224 based on the frequency of the light source.

Therefore, in one aspect, the present disclosure provides a method of obtaining a parameter of interest from a plurality of sensors in a fiber optic cable deployed in a wellbore, the method including: propagating light having variable frequency within a range of frequencies along the fiber optic cable; receiving signals responsive to interaction of the propagated light with the plurality of sensors; filtering the received signals using a programmable filter; and obtaining the parameter of interest from the filtered signals. The programmable filter may be selected using a processor. The method may further include measuring a parameter of the light selected from the group consisting of: (i) a frequency of the propagated light, and (ii) a tuning rate of a light source propagating the light, and selecting the programmable filter using the measured light parameter. In one aspect, filtering the received signals further includes reducing a component of the received signal having a frequency greater than ½ of a sampling rate. The sampling rate may be related to the variable frequency of the light source. A band-pass filter and/or a low-pass filter may be selected, for example. The parameter of interest may be one of a: (i) stress at a member downhole; (ii) temperature; and (iii) deformation of the member downhole. In various embodiments, the light source is swept across the range of frequencies to propagate the light.

In another aspect, the present disclosure provides an apparatus for obtaining a parameter of interest from a plurality of sensors in a fiber optic cable deployed in a wellbore, the apparatus including a light source configured to propagate a light having a variable frequency within a range of frequencies along the fiber optic cable; a detector configured to receive signals responsive to interaction of the propagated light with the plurality of sensors; a programmable filter configured to filter the received signals; and a processor configured to obtain the parameter of interest from the filtered signals. The processor may be configured to select the programmable filter using a parameter of the light selected from the group consisting of: (i) a frequency of the propagated light, and (ii) a tuning rate of the light source. The processor may also be configured to select the programmable filter to reduce a component of the received signals having a frequency greater than ½ of a sampling rate. The sampling rate is typically related to the variable frequency of the light source. The processor may be further configured to select the programmable filter from the group consisting of a: (i) band-pass filter and (ii) low-pass filter. The parameter of interest may be a: (i) stress at a member coupled to the fiber optic cable; (ii) temperature; and (iii) deformation of a member coupled to the fiber optic cable. In various embodiments, the light source is further configured to sweep the range of frequencies.

In yet another aspect, the present disclosure provides a system for obtaining a parameter of interest of a member deployed in a wellbore. The system includes a fiber optic cable having a plurality of sensors therein coupled to the member; a light source configured to propagate a light having a variable frequency within a range of frequencies along the fiber optic cable; a detector configured to receive signals responsive to interaction of the propagated light with the plurality of sensors; a programmable filter configured to filter the received signals; and a processor configured to obtain the parameter of interest of the member from the filtered signals. The processor may select the programmable filter using a parameter of the light selected from the group consisting of: (i) a frequency of the propagated light, and (ii) a tuning rate of the light source. The processor may select the programmable filter to reduce a component of the received signals having a frequency greater than ½ of a sampling rate. The sampling rate is typically related to the variable frequency of the light source. The parameter of interest of the member may be one of a: (i) stress at the member; (ii) temperature; and (iii) deformation of the member.

While the foregoing disclosure is directed to the preferred embodiments of the disclosure, various modifications will be apparent to those skilled in the art. It is intended that all variations within the scope and spirit of the appended claims be embraced by the foregoing disclosure.

What is claimed is:

1. A method of obtaining a parameter of interest from a plurality of sensors in a fiber optic cable deployed in a wellbore, comprising:
   propagating light having variable frequency within a range of frequencies along the fiber optic cable;
   receiving signals responsive to interaction of the propagated light with the plurality of sensors;
   filtering the received signals using a programmable filter having a cut-off frequency that varies with the variable frequency of the light source; and
   obtaining the parameter of interest from the filtered signals.

2. The method of claim 1, further comprising selecting the programmable filter using a processor.

3. The method of claim 2 further comprising measuring a parameter of the light selected from the group consisting of: (i) a frequency of the propagated light, and (ii) a tuning rate of a light source propagating the light, and selecting the programmable filter using the measured light parameter.

4. The method of claim 1, wherein filtering the received signals further comprises reducing a component of the received signal having a frequency greater than ½ of a sampling rate.

5. The method of claim 4, wherein the sampling rate is related to the variable frequency.

6. The method of claim 2, wherein selecting the programmable filter further comprises selecting one of a: (i) band-pass filter and (ii) low-pass filter.

7. The method of claim 1, wherein the parameter of interest is selected from a group consisting of a: (i) stress at a member downhole; (ii) temperature; and (iii) deformation of the member downhole.

8. The method of claim 1 further comprising sweeping the light source across the range of frequencies to propagate the light.

9. An apparatus for obtaining a parameter of interest from a plurality of sensors in a fiber optic cable deployed in a wellbore, comprising:
   a light source configured to propagate a light having a variable frequency within a range of frequencies along the fiber optic cable;
   a detector configured to receive signals responsive to interaction of the propagated light with the plurality of sensors;
   a programmable filter configured to filter the received signals by the detector using a cut-off frequency that varies with the variable frequency of the light source; and
   a processor configured to obtain the parameter of interest from the filtered signals.

10. The apparatus of claim 9, wherein the processor is further configured to select the programmable filter using a parameter of the light selected from the group consisting of: (i) a frequency of the propagated light, and (ii) a tuning rate of the light source.

11. The apparatus of claim 9, wherein the processor is further configured to select the programmable filter to reduce a component of the received signals having a frequency greater than ½ of a sampling rate.

12. The apparatus of claim 11, wherein the sampling rate is related to the variable frequency.

13. The apparatus of claim 9, wherein the processor is further configured to select the programmable filter from the group consisting of a: (i) band-pass filter and (ii) low-pass filter.

14. The apparatus of claim 9, wherein the processor is further configured to obtain the parameter of interest selected from a group consisting of a: (i) stress at a member coupled to the fiber optic cable; (ii) temperature; and (iii) deformation of a member coupled to the fiber optic cable.

15. The apparatus of claim 9, wherein the light source is further configured to sweep the range of frequencies.

16. A system for obtaining a parameter of interest of a member deployed in a wellbore, comprising:
   a fiber optic cable having a plurality of sensors therein coupled to the member;
   a light source configured to propagate a light having a variable frequency within a range of frequencies along the fiber optic cable;
   a detector configured to receive signals responsive to interaction of the propagated light with the plurality of sensors;
   a programmable filter configured to filter the received signals using a cut-off frequency that varies with the variable frequency of the light source; and
   a processor configured to obtain the parameter of interest of the member from the filtered signals.

17. The system of claim 16, wherein the processor is further configured to select the programmable filter using a parameter of the light selected from the group consisting of: (i) a frequency of the propagated light, and (ii) a tuning rate of the light source.

18. The system of claim 16, wherein the processor is further configured to select the programmable filter to reduce a component of the received signals having a frequency greater than ½ of a sampling rate.

19. The system of claim 18, wherein the sampling rate is related to the variable frequency.

20. The system of claim 16, wherein the parameter of interest of the member is one of a: (i) stress at the member; (ii) temperature; and (iii) deformation of the member.

21. A method of obtaining a parameter relating to member in a wellbore, comprising:
   placing the member in the wellbore;
   placing a fiber optic cable having a plurality of sensors on the member;
   propagating light having variable frequency within a range of frequencies along the fiber optic cable;
   receiving signals responsive to interaction of the propagated light with the plurality of sensors;
   filtering the received signals using a programmable filter having a cut-off frequency that varies with the variable frequency of the light source; and
   processing the filtered signals to determine the parameter.

* * * * *